United States Patent [19]

Bertrand

[11] 4,279,112

[45] Jul. 21, 1981

[54] METHOD FOR IMPROVING THE THERMIC INSULATION OF A BUILDING WITH A RIGID FRAME STRUCTURE

[76] Inventor: Yves Bertrand, c/o Les Batisses d'Acier Hercule Ltee., Rte. Kennedy, Ste. Marie de Beauce, Quebec, Canada

[21] Appl. No.: 88,180

[22] Filed: Oct. 25, 1979

[30] Foreign Application Priority Data

Jan. 19, 1979 [CA] Canada ................................. 319985

[51] Int. Cl.³ ............................................. E04B 1/00
[52] U.S. Cl. ..................................... 52/741; 52/404; 52/727
[58] Field of Search ................. 52/743, 404, 727, 408, 52/409, 410, 741

[56] References Cited

U.S. PATENT DOCUMENTS

| | | | |
|---|---|---|---|
| 1,895,190 | 1/1933 | Jansen . | |
| 2,742,115 | 4/1956 | Strong | 52/409 X |
| 2,799,232 | 7/1957 | Jaeger | 52/409 |
| 2,864,324 | 12/1958 | Clemcuts | 52/409 X |
| 3,182,423 | 5/1965 | Jennings | 52/404 X |
| 3,332,170 | 7/1967 | Bargs | 49/400 |
| 3,570,208 | 3/1971 | Nikai et al. | 52/746 |
| 3,590,547 | 7/1971 | Molyneux | 52/728 |
| 3,662,509 | 5/1972 | Studzinski | 52/404 |
| 3,890,795 | 6/1975 | Mauser | 61/54 |
| 3,908,327 | 9/1975 | Quigg | 52/727 |
| 3,939,665 | 2/1976 | Gosse et al. | 61/54 |
| 4,019,301 | 4/1977 | Fox | 52/725 |
| 4,147,003 | 4/1979 | Alderman | 52/743 X |
| 4,193,239 | 3/1980 | Barto | 52/404 X |

Primary Examiner—Carl D. Friedman
Attorney, Agent, or Firm—Bacon & Thomas

[57] ABSTRACT

A method for improving the thermic insulation of a metal building having a rigid frame structure comprised of metallic columns, beams, braces and rafters rigidly fixed to each other, to which sheet metal roof and wall panels are secured by metallic fasteners. A thick layer of insulating material is first placed on the inner surfaces of the roof and wall panels before they are secured to the rigid frame, and the insulating material is then pinched between said panels and the frame members. Then, insulating covers are glued in place on each of the members of the rigid frame to completely cover all exposed portions of such members within the building and under the layer of insulating material. The result is to reduce heat loss, and greatly alleviate the formation of condensate moisture within the building.

7 Claims, 6 Drawing Figures

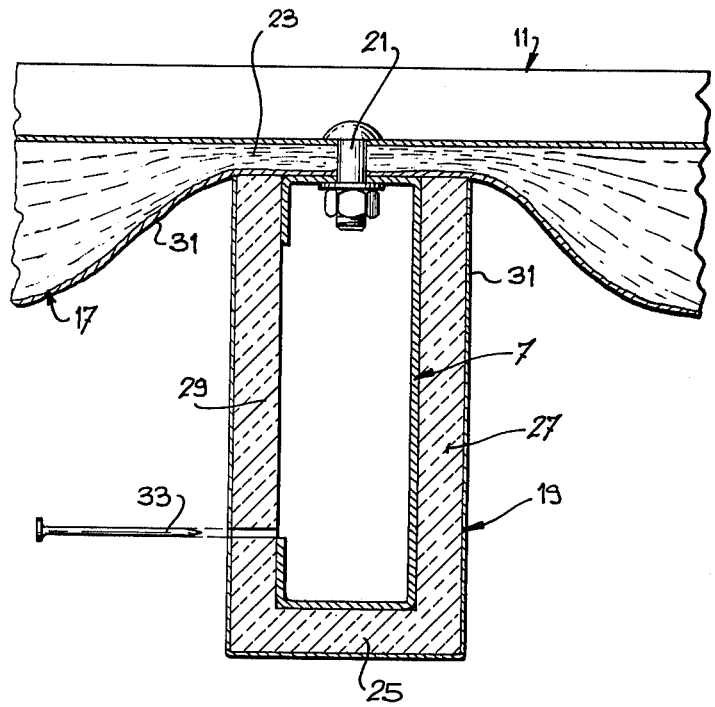
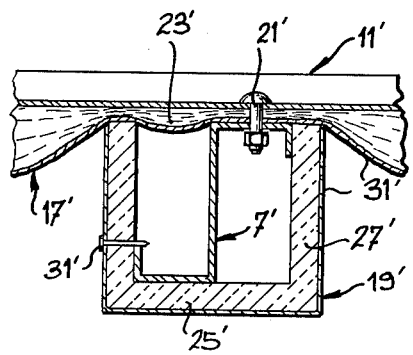
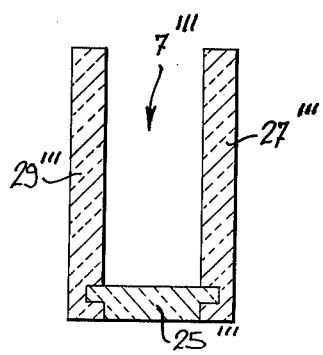
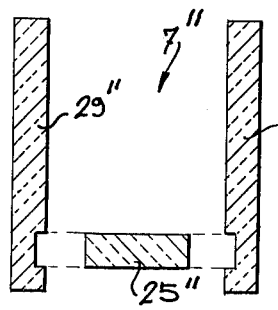
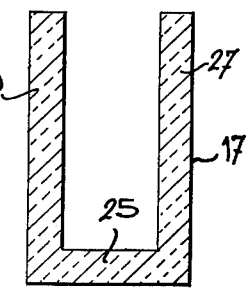
FIG. 2
FIG. 3
FIG. 6  FIG. 5  FIG. 4

METHOD FOR IMPROVING THE THERMIC INSULATION OF A BUILDING WITH A RIGID FRAME STRUCTURE

TECHNICAL FIELD OF THE INVENTION

The present invention relates generally to methods for thermally insulating buildings of the type having a rigid frame comprised of metallic columns, beams, braces and rafters rigidly fixed to each other, the rigid metallic frame supporting sheet metal roof and wall panels which are bolted or riveted thereto. More particularly, it relates to an improved method for thermally insulating such metallic buildings, designed to avoid prejudicial heat loss and the formation of moisture condensation on the elements of the rigid frame.

BACKGROUND OF THE INVENTION

The use of buildings having rigid metallic frames covered with sheet metal roof and wall panels has become widespread, and efforts have been made at thermally insulating such metallic buildings. The method of insulation in common use involves fixing a thick layer of insulating material, such as glass wool, onto the inner surfaces of the sheet metal roof and wall panels before they are secured to the metallic columns, beams braces and rafters comprising the rigid frame of the building. The wall panels are commonly secured in place by bolts or rivets, and the layer of insulating material is compressed and pinched between the panels and the rigid frame by the fasteners.

While this common method of insulation is generally known and used, problems exist. There is first of all a significant, prejudicial heat loss which occurs because of the metal-to-metal contact between the sheet metal panels, the rigid metallic frame, and the metallic fasteners used to secure the panels to the rigid frame. The metallic fasteners in effect provide a permanent thermal conduit between the interior and the exterior of the building, since they are good thermic conductors, and the pinching of the layer of insulating material between the rigid frame and the panels caused by the presence of the fasteners contributes to the thermal flow.

Further, there is at present a condensate problem found in many such buildings, again resulting from the metal-to-metal contact required in their construction. The formation of condensate will sometimes occur on substantially every part of the rigid metallic frame, which is maintained in thermal contact with the exterior sheet metal roof and wall panels by the metallic fasteners. This condensation can cause problems for the occupants and usage of the building, and is undesirable.

The loss of heat from such rigid frame metallic buildings, even when insulated in the manner noted, is a known problem. The heat loss occurs by both conduction and convexion, and is obviously prejudicial to efficient energy use. The accompanying problem of moisture condensation on the rigid metallic frame within the building is also prejudicial for the obvious reasons. Efforts to overcome these two problems have been undertaken in the past, and have included increasing the thickness of the insulation layer applied to the roof and wall panels, and the insertion of a reflective foil between the panels and the insulation. However, the problems have remained.

There is thus need for a method of insulating such rigid frame metallic buildings so as to prevent excessive heat loss, and to alleviate the formation of moisture condensate on the parts of the rigid frame. The present invention is directed toward meeting that need.

BRIEF SUMMARY OF THE INVENTION

In the insulating method of the invention, the first step is to place a thick layer of insulating material onto the inner surfaces of the sheet metal roof and wall panels before they are secured to the metallic rigid frame of the building. This step is similar to that which is now employed for insulating such rigid frame metallic buildings.

Subsequently, after the roof and wall panels have been secured to the rigid frame, rigid coverings made of an insulating material are glued onto every column, beam, rafter and brace comprising the rigid metallic frame of the building, the coverings being shaped and designed so as to completely cover the visible portions of the various elements of the rigid frame which appear within the building under the layer of insulating material pinched between the frame and the wall or roof panels. It has been found that by completely and perfectly insulating the rigid frame structure in this manner, the problem previously found in such buildings can be eliminated. The present method produces a significant, major reduction in the loss of heat from within the completed building, and greatly alleviates the condensation phenomenon common before now in such buildings.

In order to facilitate the installation of the rigid insulating covering onto the metallic elements of the rigid frame, the invention contemplates the use of common nails. The nails are passed through the coverings to engage the frame elements and hold the coverings in place until the glue has been allowed to dry. After gluing has been completed, the nails are preferably removed, to avoid any further loss of heat through conduction caused by metal-to-metal contact of the nails with the rigid frame elements.

In order to improve the quality of the insulation provided by the invention, the edges of the rigid coverings already glued onto the metallic frame structure can also be glued onto the thick layer of insulating material pinched between the frame and the wall and roof panels when the building is assembled. As a further assurance of quality, the invention also contemplates that the entire surface of both the rigid insulating coverings glued onto the frame structure and the thick layer of insulating material pinched between the sheet metal panels and the rigid metallic frame can be covered with a layer of waterproof material, such as a sheet of plastic or a vinyl material.

In a first preferred embodiment of the invention, the rigid insulating coverings are made in a U-shaped configuration, and are shaped so they can be engaged on every element of the frame structure. In a second preferred embodiment, the rigid coverings are comprised of several flat panels which are joined perpendicularly to each other, so as to form a U-shaped element that can thereafter be engaged on the parts of the rigid frame. The length and thickness of the rigid insulating coverings can be varied depending upon the user's requirements.

It is the principal object of the present invention to provide an improved method for insulating rigid frame metallic buildings to reduce heat loss and to greatly alleviate the problem of moisture condensate forming within the buildings.

Another object is to provide an insulation method for rigid frame metallic buildings which is easy to employ, and which can increase the usefulness of such buildings.

Other objects and many of the attendant advantages of the invention will become readily apparent from the following description of the preferred embodiments, when taken in conjunction with the accompanying drawings.

BRIEF DESCRIPTION OF THE DRAWINGS

FIG. 2 is a cross-sectional view of a C-shaped beam having a roof panel connected thereto, and insulated in accordance with the invention;

FIG. 3 is a cross-sectional view similar to FIG. 2, but showing a Z-shaped metallic beam; and FIGS. 4-6 are cross-sectional views of different embodiments of rigid insulating coverings, usable in accordance with the invention for insulating the parts of a rigid metallic building frame.

DETAILED DESCRIPTION OF THE PREFERRED EMBODIMENTS

Figure 1:
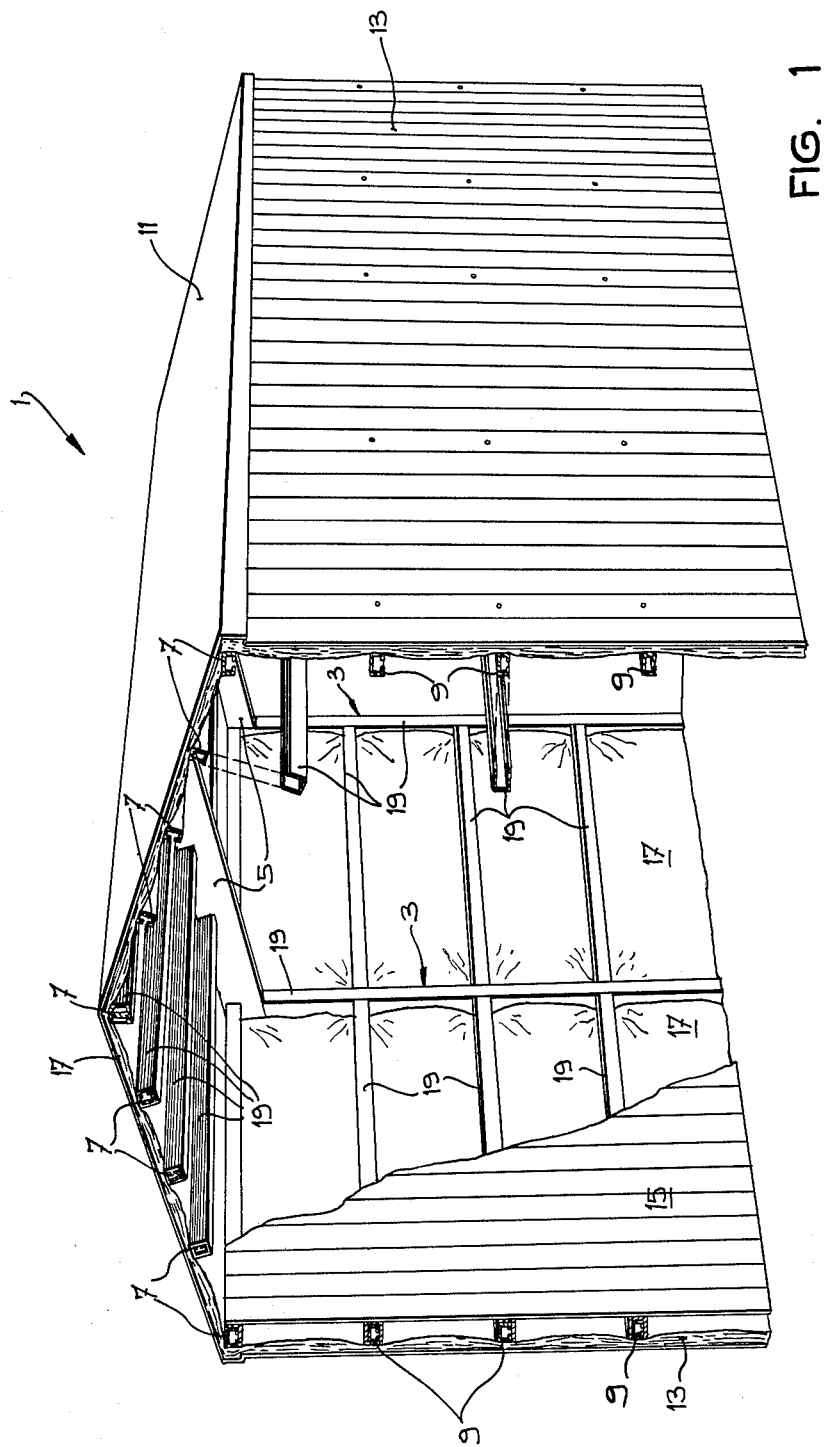
FIG. 1 is a perspective view, partially in cross section, of a rigid frame metallic building insulated according to the method of the invention.

Referring now to the drawings, a rigid frame metallic building is shown at 1 at FIG. 1, and includes a rigid metallic frame constructed of vertical columns 3 which support a set of horizontal beams 5, the columns 3 and the beams 5 in turn supporting a set of parallel rafters 7 on which are secured sheet metal panels for forming the roof 11 of the building. The vertical columns 3 are connected to each other by a set of horizontal braces 9, which are used both for reinforcing the structure on the building and as a base for attaching sheet metal panels for forming the building's vertical walls 13.

The rafters 7 used for mounting the roof 11, as well as the horizontal braces 9 used for mounting the walls 13, consist of profile metallic members having a C-shaped cross section, as shown in FIGS. 1 and 2, or in the alternative a Z-shaped cross section, as shown in FIG. 3, at 7'. The sheet metal panels used to form the roof 11 and the walls 13 are fixed to the rigid frame by direct bolting, using bolts 21 and 21', as shown in FIGS. 2 and 3, respectively. In the alternative, rivets can be employed in place of the bolts 21 and 21', or the panels can be secured by means of bridges that are bolted onto the panels and the frame members, as is known in the art. The resulting metallic building and the described method of construction therefor are already well known.

If needed or desired, the interior of the metallic building 1 can be completed with an internal wall 15, fixed directly to the columns 3 and the braces 9, to improve the interior finishing of the structure.

In accordance with the known method for improving the thermic insulation of a metallic building of this type and, as the first step of the present method, a thick layer 17 of an insulating material, such as glass wool, is fixed onto the inner surfaces of the sheet metal roof and wall panels before they are bolted onto the rafters 7 and the braces 9. This thick layer 17 of glass wool can be glued directly onto the inner surfaces of the roof and wall panels, or it can simply be pinched in position between the panels and the frame members when the panels are bolted in place.

As will be understood from the above description of the known method, the insulation layer 17 is systematically compressed or flattened out at 23 behind the columns 3, the beams 5, the rafters 7 and the braces 9, because of the clamping action of the bolts 21 and 21' or of whatever alternative fasteners are used to secure the roof and wall panels to the metallic building frame. This compressing is shown in FIG. 1, and especially in FIGS. 2 and 3. The compressed portion 23 of the glass wool or other insulation layer 17 has a reduced insulation property, which helps to cause a permanent loss of heat from within the building 1. There is also a loss of heat when the parts of the rigid building frame are exposed within the building, because of metal-to-metal contact of the roof and wall panels with the parts of the metallic frame, through the metallic fasteners 21 and 21'. The heat loss from the building occurs not only by natural conduction between the sheet metal wall and roof panels and the parts of the rigid metallic building frame, but also by convexion because of the reduced thickness area 23 of the insulating layer 17.

In practice, this loss of heat is undesirable because of the need to then further heat the building interior to make up for the heat loss. Further, a condensation phenomenon occurs on every part of the exposed frame structure, as has been described, which can be very annoying for the user, and cause damage to the building and its contents over time. The next step of the present method overcomes these problems, wherein all of the exposed parts of the frame structure of the building 1 are insulated with the use of rigid coverings 19 made of insulating material. In the second step of the present method, a rigid insulation covering 19 is secured to every column 3, beam 5, rafter 7 and brace 9, so that all exposed portions thereof are completely covered.

Referring now especially to FIG. 2, the rigid coverings 19 preferably have a U-shaped cross section so they can be easily engaged on every part of the frame members to be insulated. Every rigid insulating covering 19 comprises a bottom 25 and two lateral sides 27 and 29 arranged to completely cover, for example, a rafter 7 up to the level of the compressed portion 23 of the insulating layer 17. From an examination of FIG. 2, it will be understood that the insulating covering 19 is used for "doubling" the thermic insulation of the compressed portion 23 of the insulating layer 17; if the insulation value of the covering 19 is chosen to be great enough, all of the insulation value lost by the necessary compressed or pinched insulation portion 23 can be fully recovered in the present invention, and then some. By completely covering the members of the rigid metallic frame, no exposed metal is present within the building to act as a direct heat conductor between the building interior and the sheet metal roof and wall panels.

In order to reduce loss of heat from the building, as much as possible, in the second step of the present method the insulating coverings 19 are directly glued onto the external surface of the brace, rafter, column or beam upon which they are placed. This gluing can be facilitated by using one or several common nails 33, as shown in FIG. 2, which can be inserted in an appropriate manner through the insulating covering 19 to engage with the structural member being covered, to hold the covering in place while the glue dries. When the glue has dried, the nails 33 are removed to avoid loss of heat by conduction from the metal of the nails to the metal of the structural parts of the building frame.

In order to improve the strength of the insulating covering, the upper edges of the parallel walls 27 and 29 of the coverings 19 can be glued onto the surface of the insulating layer 17. This provides an essentially integral insulating layer within the building 1.

By thus insulating the structural elements of the metallic building frame, the condensation problem is significantly alleviated. A further reduction in the risk of condensation can be achieved by covering the rigid insulating coverings 19 and the insulating layer 17 with a layer 31 of waterproof plastic or the like, such as a layer of vinyl material. This arrangement not only helps to improve the thermic insulation of the building 1, but as noted will help to further reduce the condensation problem.

Any kind of insulating material having a certain rigidity can be used for making the coverings 19. However, use will preferably be made of materials such as polystyrene, STYROFOAM™, rigid glass wool or cork. These materials all have good insulating properties and, in addition, they can be easily cut and thus adjusted according to the user's requirements.

The installation of the insulating coverings 19 can be facilitated by using rigid coverings already having a U-shaped configuration in cross section, as shown in FIGS. 2, 3 and 4. But use can also be made of rigid coverings comprised of several flat panels joined perpendicularly to each other by means of tenons and mortises, so as to form a U-shaped element. Such coverings are shown in FIGS. 5 and 6, the numbering of the parts of the coverings being the same in these FIGS. as in FIG. 2, except for the use of double and triple primes, respectively. Methods and techniques other than those shown in FIGS. 5 and 6 can of course be used for joining the flat panels together, the selection of the appropriate method depending on the manufacturer or the user's requirements and desires.

Referring now to FIG. 3, a Z-shaped metallic rafter 7' is shown therein, to better illustrate the universality of the method according to the invention. A rigid insulating covering 19' is shown mounted onto the rafter 7', and is in engagement with the outer surfaces thereof. As in FIG. 2, all of the exposed parts of the rafter 7' are covered by the rigid covering 19', the method of mounting being the same as described for FIG. 2, and the components of FIG. 3 being identical to the like components of FIG. 2 and carrying the same reference numbers, except that the numbers are provided with primes.

It will be seen that the two-step insulating method of the invention overcomes the problems previously known in insulating metal frame metallic buildings, and that the objects set forth hereinabove have been achieved. Obviously, modifications and variations of the invention are possible.

I claim:

1. The improved method for thermally insulating a building having a rigid metallic frame comprised of columns, beams, braces and rafters rigidly fixed to each other and designed to support sheet metal roof and wall panels which are bolted or similarly secured thereto, said method comprising the steps of:

placing a thick layer of insulating material onto the inner surfaces of the roof and wall panels before they are secured to the metallic frame, and then securing said panels to said frame, said layer of insulating material being compressed and pinched between the roof and wall panels and the parts of said rigid metallic frame to which they are fastened; and subsequently completing the insulating of said building by gluing rigid coverings made of insulating material onto every column, beam, brace and rafter of said rigid frame, said rigid coverings being previously cut and shaped so as to completely cover the visible portions of said rigid frame appearing within said building under the layer of insulating material pinched between said frame and said roof and wall panels when the building is assembled, and said rigid coverings being in engagement with and being glued to said layer of insulating material whereby an essentially integral insulating layer is provided within the building.

2. The method according to claim 1, oincluding the additional step of covering the entire surface of the rigid coverings glued onto the members of said frame and of the thick layer of insulating material with a layer of waterproof material.

3. The method according to claim 1, including the step before said gluing step of forming said rigid coverings to be glued onto the members of said frame with a U-shaped cross section, and then engaging said U-shaped coverings as such on said frame members.

4. The method according to claim 3, wherein said step of forming U-shaped rigid coverings includes joining several flat panels generally perpendicularly to each other, so as to form a U-shaped element that is thereafter engaged on said frame members.

5. The improved method for thermally insulating a building having a rigid metallic frame comprised of columns, beams, braces and rafters rigidly fixed to each other and designed to support sheet metal roof and wall panels which are bolted or similarly secured thereto, said method comprising the steps of:

placing a thick layer of insulating material onto the inner surfaces of the roof and wall panels before they are secured to the metallic frame, and then securing said panels to said frame, said layer of insulating material being compressed and pinched between the roof and wall panels and the parts of said rigid metallic frame to which they are fastened; and subsequently completing the insulating of said building by gluing rigid coverings made of insulating material onto every column, beam, brace and rafter of said rigid frame, said rigid coverings being previously cut and shaped so as to completely cover the visible portions of said rigid frame appearing within said building under the layer of insulating material pinched between said frame and said roof and wall panels when the building is assembled, and said rigid coverings being fixed in place during gluing on their receiving frame members with nails, said nails being removed after the glue is dried.

6. The method according to claim 5, wherein the rigid coverings glued onto the frame structure are also glued onto the thick layer of insulating material pinched between the components of said frame and said roof and wall panels.

7. The method according to claim 6, wherein the thick layer of insulating material pinched between said frame and said roof and wall panels is made of glass wool, and the rigid coverings glued onto the members of said frame are made of thermal insulating material.

* * * * *